Figure 1:
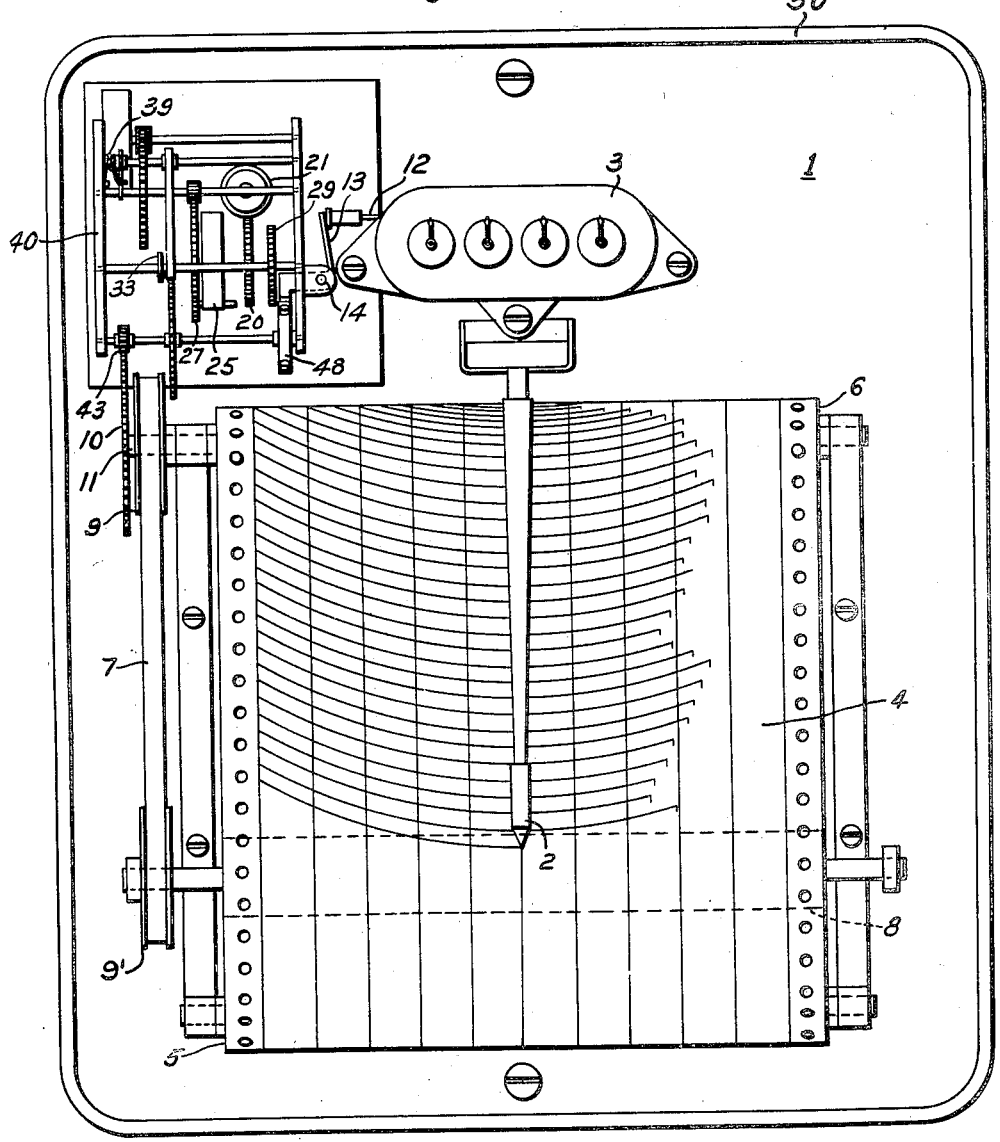

Dec. 1, 1931.   B. G. LA BAR ET AL   1,834,406
RECORDING DEMAND METER
Filed Sept. 13, 1928   2 Sheets-Sheet 1

INVENTORS
Bert G. LaBar &
Walter G. Mylius.
BY
ATTORNEY

Dec. 1, 1931.  B. G. LA BAR ET AL  1,834,406
RECORDING DEMAND METER
Filed Sept. 13, 1928   2 Sheets-Sheet 2

INVENTORS
Bert G. LaBar &
Walter G. Mylius.
BY
Wesley G. Carr
ATTORNEY

Patented Dec. 1, 1931

1,834,406

UNITED STATES PATENT OFFICE

BERT G. LA BAR, OF UNION, AND WALTER G. MYLIUS, OF SUMMIT, NEW JERSEY, ASSIGNORS TO WESTINGHOUSE ELECTRIC AND MANUFACTURING COMPANY, A CORPORATION OF PENNSYLVANIA

RECORDING DEMAND METER

Application filed September 13, 1928. Serial No. 305,653.

Our invention relates to recording demand meters and more particularly to the pen-tripping and chart-moving mechanisms utilized in such meters.

Our invention has for an object to provide means for improving and simplifying the chart-moving and pen-tripping mechanisms which are utilized in recording demand meters.

Another object of our invention is to provide means for making use of a small low-torque synchronous motor for furnishing both the source of power and the timekeeping requisites necessary for operating the above-mentioned mechanisms.

Heretofore, in recording demand meters, two large clock springs have been employed to supply the necessary motive forces for operating, respectively, the forward movement of the recording chart and the tripping movement to release the pen from its driving mechanism. One of said springs usually operates a clock-work mechanism which releases the other spring momentarily at predetermined regular intervals to perform the above-mentioned movements. The clock springs are wound either by hand or by a relatively large electric motor.

In our present invention, we avoid the use of both of said clock springs by the use of a small synchronous motor that not only stores up its energy in a small spring but also acts as a timekeeper and releases the small spring periodically, whereby the latter, at each release, expends its stored energy in performing the functions of moving the recording chart and tripping the pen.

Our invention, however, may be more readily understood if the accompanying drawings are referred to in connection with the following description.

Figure 2:
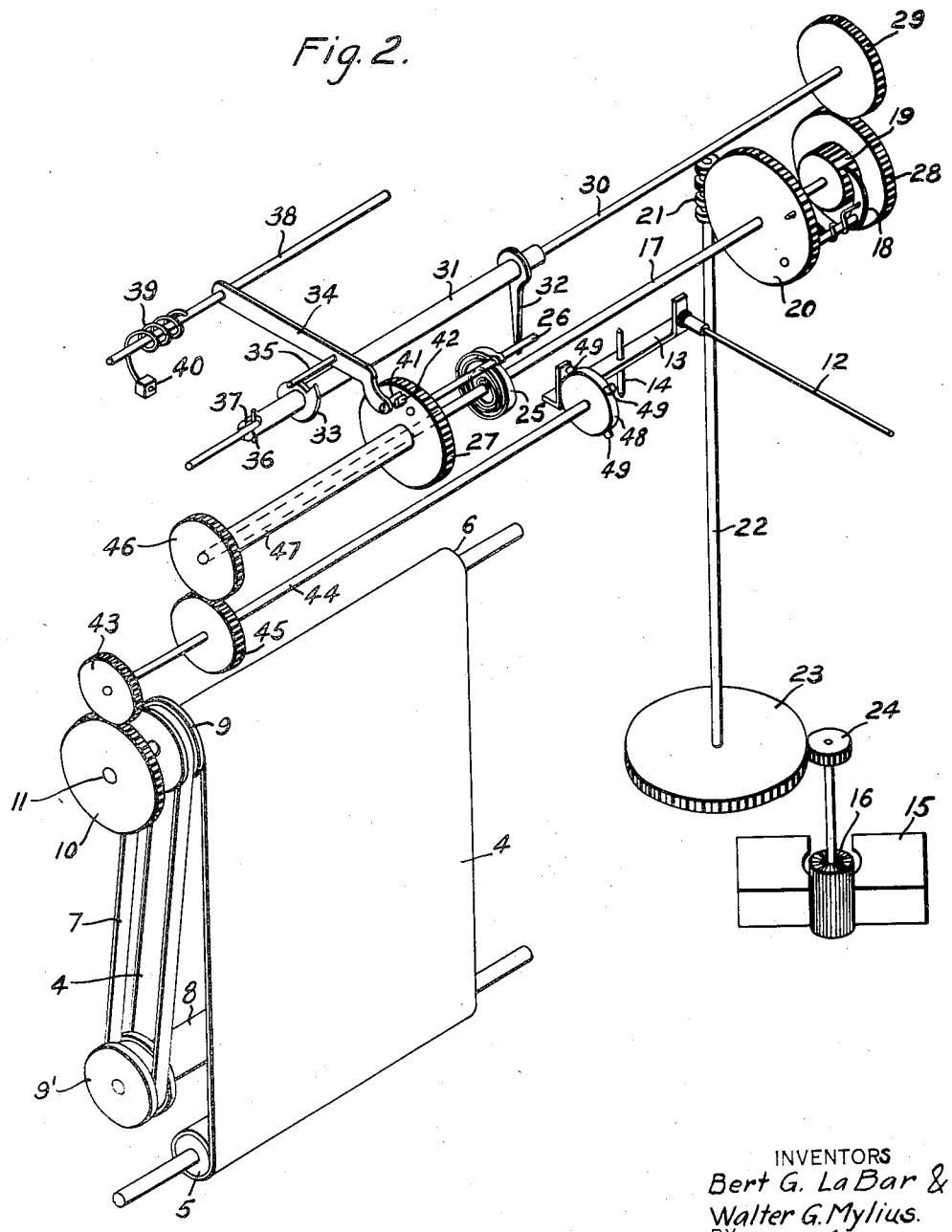

In the drawings:

Figure 1 is a view, in front elevation, of a recording demand meter having a pen-tripping and paper-moving mechanism associated therewith constructed in accordance with our invention, and Fig. 2 is a diagrammatic distorted perspective view of said mechanism.

A recording demand meter 1, to which our invention is particularly applicable comprises a pen 2 and a registering mechanism 3 that are both driven by a meter (not shown), such as a watthour meter.

The pen 2 coacts with a paper chart 4 that is moved upwardly from a lower spool 5 to an upper spool 6 by means of pins on the upper spool 6 that coact with holes in the paper 4. The upper spool 6 is rotated by means of a gear wheel 10 mounted on a shaft 11 to which the spool and pulley wheel 9 is secured.

The paper chart is re-rolled upon a spool 8 by means of belt 7 connecting the pulley 9 and pulley 9' secured to the re-roll spool 8.

The meter is operatively connected to the pen 2 by a suitable disconnectible gear drive which is disconnected, by means of a rod 12 when the latter is moved a short distance to the right under the influence of a lever 13 that is pivotally mounted on a shaft 14.

In recording demand meters of the type described above, means have been provided for tripping the pen to allow it to return to an initial zero position and, at the same time, for moving the paper chart a slight distance at the ends of predetermined intervals of time, whereby the pen coacts with the paper to make a record of the amount of energy metered for each predetermined interval of time.

Our invention comprises a novel mechanism for tripping the pen and for moving the paper at the end of each period.

A small synchronous motor 15, that is connected to the circuit the energy of which is being measured, or to any other convenient source of electric supply, accomplishes the pen-tripping and chart-moving functions. The motor 15 is a very small constant-speed motor and is preferably of the synchronous type. The motor is so small, in fact, that the torque thereof is insufficient to ordinarily perform the tripping and chart-moving functions, but, by means of the arrangement hereinafter described, these functions are successfully performed. In our invention, the motor 15 not only furnishes the source of motive power for performing the operations required, but, inasmuch as power companies now supply energy at constant, and standard, frequencies, the motor 15 also acts as a clock to time the predetermined periods.

Preferably, for performing the above functions, the armature 16 of the motor 15 drives a shaft 17 through a pinion 24, a gear wheel 23, a shaft 22, a worm 21, a worm wheel 20, a pawl 18 and a ratchet wheel 19. The shaft 17 is turned by the ratchet wheel 19, and the gear wheel 20 is freely rotatable on the shaft 17. A spiral spring 25 is coiled around the shaft 17, one end being secured to the shaft and the other end to a pin 26 which projects from one side of a wheel 27 near its periphery.

A gear wheel 28 is mounted on one end of the shaft 17 and operatively meshes with a gear wheel 29 that is mounted on one end of a shaft 30. The shaft 30 has a sleeve 31 disposed thereon which is provided with a finger 32 to coact with the pin 26. A cam 33 is also secured to the sleeve 31 to move an arm 34 through engagement with a pin 35 secured thereto. The sleeve 31 is permitted a slight rotative movement with respect to the shaft 30 by means of a pin 36 extending through the shaft and engaging shoulders 37 cut in the end of the sleeve 31. The arrangement is such that, while, normally, the cam 33 is turned by the motor 15, through the gear mechanism illustrated, the spring 25 itself gives the cam 33 a slight kick to permit the arm 34 to immediately drop after the wheel 27 has been permitted to move by the raised position of the arm 34.

The arm 34 is pivotally mounted by means of a shaft 38, and is given a downward bias against the cam 33 by a spring 39 having one end secured to the shaft 38 and the other end secured to the frame 40 of the mechanism. A stop member 41 is mounted on the end of the arm 34 to coact with a similar stop member 42 mounted on the wheel 27 to limit the latter to one revolution at a time or one revolution at the end of each predetermined time interval. It is to be understood, of course, that the length of the time intervals may be of any desired value. In practice, fifteen minute intervals are common, but, obviously, any value may be determined upon, within the scope of the present invention.

The wheel 27, that is turned by the influence of the spring 25 when the same is wound up by the motor 15 and released by the cam 33, turns the paper chart 4 through the gear wheel 10, a gear wheel 43 coacting therewith, shaft 44 on which the gear wheel 43 is mounted, gear wheel 45, also mounted on the shaft 44, gear wheel 46 meshing therewith and sleeve 47 to which both the gear wheel 46 and the gear wheel 27 are secured.

A wheel 48 is also mounted on the shaft 44 to be turned therewith to kick the lever 13 to effect the movement of the rod 12 to disconnect the pen 2. Four projections 49 on the periphery of the wheel 48 effect the movement of the lever 13 and the rod 12 every quarter revolution of the wheel 48. It is to be understood that the number and arrangement of the projections 49 on the wheel 48 depend upon the length of time desired between successive releases of the pen-tripping mechanism.

The spring 25 is wound by the motor 15 during the predetermined interval of time and, at the end of such time, the cam 33 lifts the arm 34 to disengage the stops 41 and 42. The spring 25 is released by this action and expends its energy in moving the chart 4 and tripping the pen 2, as outlined above. Just after the spring 25 is released, the finger 32 is in position to be struck by the pin 26 to thereby rotate the sleeve 31, and the cam, a portion of a revolution whereby the high-point on the cam is moved from under the pin 35 and permits the arm 34 to drop. The stop 41 is then in proper position to re-engage the stop 42 on the wheel 27 when the latter has completed one revolution. If means were not provided for stopping the wheel 27, the latter would make several revolutions under the influence of the spring 25 before the motor 15 could move the cam 33 in position to drop the arm 34.

As pointed out above, the motor 15 itself is incapable of moving the chart 4 and tripping the pen 2, but, in accordance with our invention, the motor winds up the relatively small spring 27 and releases the same periodically so that it expends its accumulated energy in performing the desired functions.

Our mechanism is small, relatively cheap, and uses only a fraction of the power heretofore required for the same performance. The entire mechanism may be conveniently mounted in one corner of the meter casing 50, as illustrated in Fig. 1.

It will be apparent to those skilled in the art that changes may be made in the structure set forth without departing from the spirit and scope of our invention, and we desire, therefore, that only such limitations shall be placed thereon as are imposed by the prior art and set forth in the appended claims.

We claim as our invention:

1. In combination, a continuously-running constant-speed electric motor, a spring, means for winding said spring a predetermined amount by said motor, means driven by said motor for releasing said spring at the end of predetermined time intervals, and means for utilizing the energy stored in said spring upon said release.

2. In combination, a continuously-running constant-speed electric motor, means for accumulating the energy of said motor for predetermined intervals of time, means driven by said motor for releasing said energy-accumulating means at the end of each of said time intervals, and means for utilizing said energy for effecting a control.

3. In a recording demand meter, a synchronous motor and a spring, said motor being so connected as to wind said spring and to time the operation of the release of the spring to perform the desired functions.

4. In combination, a synchronous motor, a spring wound by said motor, means driven by said motor for releasing said spring, and means driven by said spring.

In testimony whereof we have hereunto subscribed our names this 6th day of Sept., 1928.

BERT G. LA BAR.
WALTER G. MYLIUS.